United States Patent [19]

Cuneo

[11] 4,363,343
[45] Dec. 14, 1982

[54] COMBINATION GUARD AND RABBETING DEPTH GAUGE ASSOCIATED WITH POWER PLANER

[75] Inventor: Giuseppe Cuneo, Calolziocorte, Italy

[73] Assignee: Black & Decker Inc.

[21] Appl. No.: 190,228

[22] Filed: Sep. 24, 1980

[51] Int. Cl.³ .................. B27C 1/10; B27G 21/00; B27C 1/14
[52] U.S. Cl. .......................... 145/4; 145/20; 144/117 C
[58] Field of Search .............. 145/4, 4.2, 4.1, 20; 144/117 C

[56] References Cited

U.S. PATENT DOCUMENTS

| | | |
|---|---|---|
| 1,812,755 | 6/1931 | Quinsler . |
| 1,899,204 | 2/1933 | Matthews ........................... 145/4 |
| 2,562,832 | 7/1951 | Strandberg ......................... 145/4 |
| 2,894,549 | 7/1959 | Garland ............................. 145/4 |
| 2,984,270 | 5/1961 | Abberly et al. . |
| 3,126,929 | 3/1964 | Pedersen ............................ 145/4 |
| 3,207,195 | 9/1965 | Anton . |
| 3,253,624 | 5/1966 | Fegan et al. . |

FOREIGN PATENT DOCUMENTS 823039 11/1951 Fed. Rep. of Germany .
2051083 4/1971 France .
47-15760 6/1972 Japan .

Primary Examiner—Donald R. Schran
Attorney, Agent, or Firm—Walter Ottesen; Edward D. Murphy; Harold Weinstein

[57] ABSTRACT

A portable hand-held planer in a housing containing a rotatable cylindrical cutting planing tool. The tool is rotatably driven by an electric motor. The planing tool has a plurality of elongated cutting blades positioned around the tool. A portion of the tool projects downwardly from the housing to enable the tool to make contact with a surface of a workpiece when the tool is operated. One side of the housing is provided with a combination guard and rabbeting depth gauge to prevent access to the underside of the planer proximate the planing tool while at the same time control the depth to which a rabbet cut is to be made in the workpiece. The opposite side of the planer has an adjustable fence assembly whereby the width of the rabbet cut may be controlled. The combination guard and rabbeting depth gauge includes a guard plate having a shoe for sliding contact on a workpiece which is spring loaded downwardly to contact the workpiece. There is a movable, clampable slide to control the depth of the rabbet cut by abutting against the shoe when the rabbet cut has been planed to the desired depth.

12 Claims, 10 Drawing Figures

COMBINATION GUARD AND RABBETING DEPTH GAUGE ASSOCIATED WITH POWER PLANER

BACKGROUND OF THE INVENTION

Portable hand-held planers are well known in the industry. These devices usually encompass a housing in which is located an electric motor and a cylindrical rotatable planing tool. Appropriate transmission means is supplied between the motor and the tool. The planer is usually held in a manner when operated whereby the cylindrical tool rotates on a horizontal axis and numerous passes against a work piece are made until the wooden work piece or a portion thereof has been planed away or rabbeting has been accomplished. The major portion of the planing tool is positioned in the housing. A rectangularly shaped opening is usually supplied at the bottom of the planer and a portion of the planing tool projects therefrom to impinge on a work piece.

As it is desirable, especially when attempting to accomplish rabbeting, to control the depth to which the planer may be permitted to go, a depth gauge is provided. The prior art is replete with teachings as to how this may be accomplished. One way is to provide a shoe which makes contact with an unplaned portion of the work piece being planed so that the depth to be achieved is a relationship between the unplaned portion and the planed portion. The shoe prevents further downward movement of the planer. By attaching or integrating the shoe to an upstanding portion and by providing means for adjustably and selectively clamping this upstanding portion at a selected desirable point a depth gauge is thereby provided.

As the planing tool operates at extremely high revolutions per minute and as the planing tool has extremely sharp cutting surfaces, it has been found desirable to prevent easy or accidental access to the planing tool from the side of the planer having the depth gauge.

To accomplish this salutary end, some portable planers are fitted with a metal shield alongside one side of the planer proximate the planing tool. The shield is designed to extend for a short distance between the bottom of the housing for approximately the same dimension as the planing tool. Such a shield poses a problem, for as the planer cuts the work piece to a predetermined level, provision must be made to get the shield out of the way but not so much that the planing tool is accessible from the side. Consequently, some shields have been hingedly mounted so that as the planer descends the shield pivots arcuately upwardly and out of the way. This is permissible when there are no side obstructions in an odd shaped work piece, but can pose a problem on occasion.

It is also accepted practice to provide a guide for controlling the width of a cut produced by a planer. In correct parlance this would be known as a rabbet. A guide of an appropriate type would be a fence assembly. Such an assembly is positioned on the side of the planer opposite to the side carrying the depth gauge and guard mechanism. Such an assembly consists generally of an elongated flat plate which appears to depend downwardly from the housing of the planer and is adjustably movable underneath the housing and planing tool. In use the work piece has a side surface in abutment with the flat plate.

It will be appreciated from the foregoing that the prior art portable hand-held planers are provided with three indispensable elements, namely, depth gauge, guard means and fence assembly for controlling the width of a cut.

SUMMARY OF THE INVENTION

In the hereinafter following there will be provided a detailed description of the invention. At this juncture, it is believed to be sufficient to provide a succinct overall view of the ingenious features of the present invention.

To begin with, the invention relates to a hand-held portable electric planer that combines the feature of a depth gauge with a guard mechanism. In one embodiment a novel structure for a fence assembly will also be elucidated in detail. It will be seen that the premise of combining the depth gauge with a guard mechanism is salutary. Manufacturing costs can thereby be reduced without sacrificing safety and utility. Such a combination, not heretofore shown or disclosed is an advance in the state of the art.

As will be noted in greater detail below, the planer to which this invention is applicable, itself, is of a fairly conventional structure, being supplied with a suitable housing, handle, electric conduit and means for adjusting the cutting bite of the cylindrical planing tool that extends to a very small extent from a rectangular opening at the bottom of the housing. In the present planer, one side of the housing above the area in which the planing tool is found is provided with structure to retain a combination depth gauge and guard. The combination is constructed of an L-shaped plate where the bottom leg is a shoe, the underside of which engages the upwardly facing surface of that portion of the work piece not planed. This L-shaped plate is urged downwardly for a fixed maximum distance and thereby inhibits access to the planing tool from that side. Operative means is provided in association with the L-shaped plate to control the distance to which the L-shaped plate may be counter urged into the housing. The operative means in the housing may be adjusted so that the L-shaped plate may be moved into the housing to a predetermined distance after which it cannot be urged additionally so that the operative means acts as a stop.

When the planer is raised from the work piece after the planing depth has been achieved or at any point prior as when numerous passes are made, the L-shaped plate descends to its normal spring urged position, thereby inhibiting access to the planing tool. Yet, the depth gauge is still set at the predetermined position and will remain in this position until modified.

At the other side of the housing, a fence assembly is provided and comprises an L-shaped bracket. The upstanding portion is suitably attached to the housing. The other portion is attached to an elongated member by means of a clamping bolt the shank of which passes through an elongated slot in the member. The end closest to the housing is supplied with a fence normal to the elongated member and disposed to move under the planer including the planing tool. Adjustment is achieved by means of the clamping bolt and a nut carrying knob suitable therefor.

DETAILED DESCRIPTION OF THE INVENTION

Figure 1:
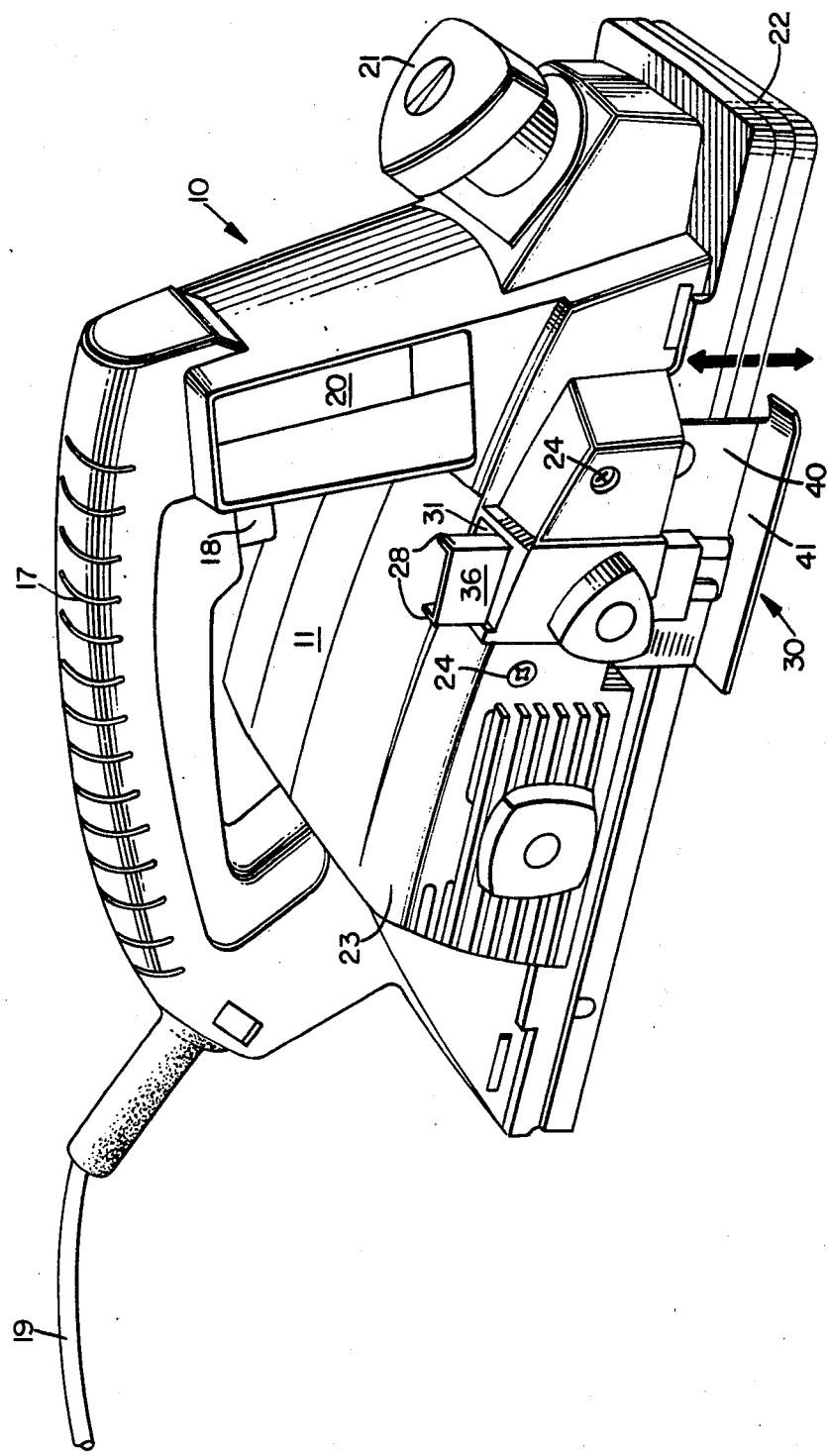
FIG. 1 is a perspective view of a portable planer of that side depicting the combination guard and depth gauge of the present invention.
Figure 4:
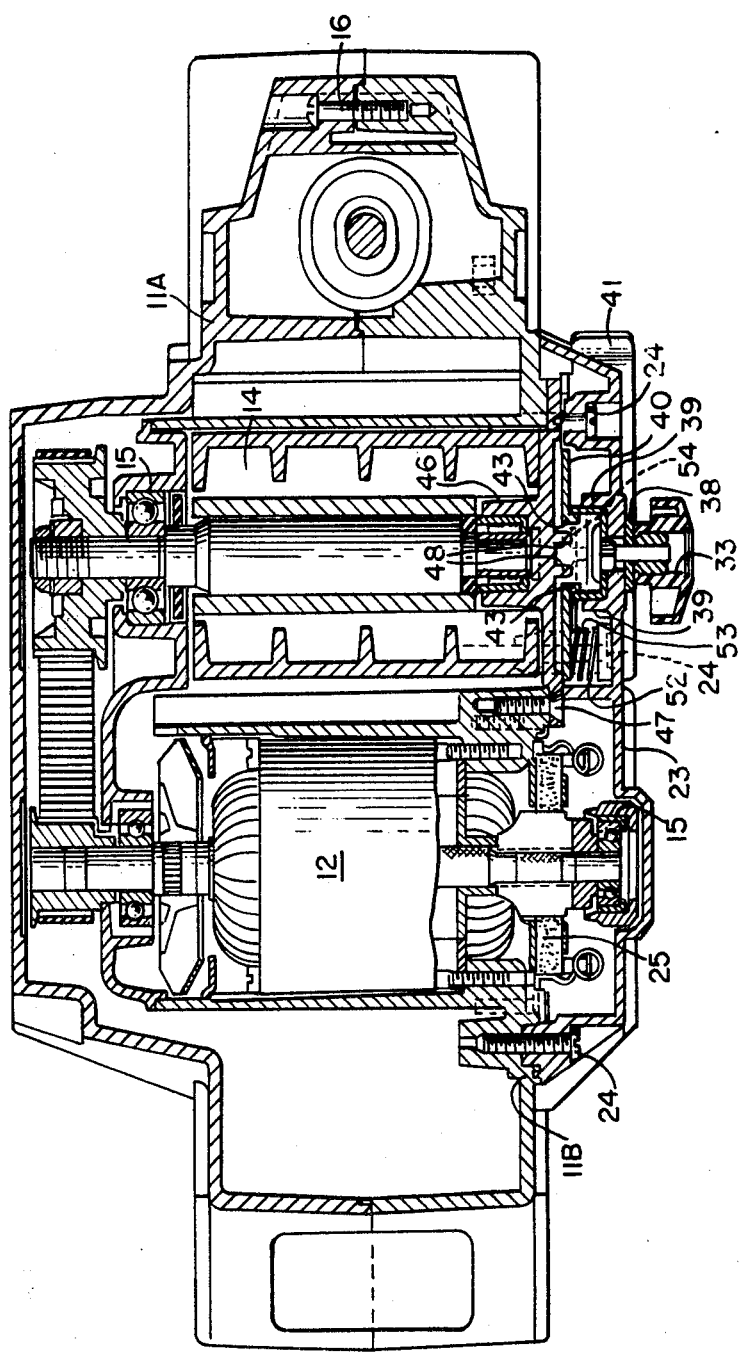
FIG. 4 is a horizontal cross-sectional view taken along line 4—4 of FIG. 3 showing the planer except for the fence assembly. This view shows significant details of the combination guard and depth gauge being depicted.

Now, turning to the drawings for a better understanding of the invention, attention is directed to FIG. 1 which depicts the planer, generally, 10 of the present invention. The planer 10 possesses a number of relatively conventional parts, for instance, a housing 11, which may be constructed of metal or a suitably polymeric material or a combination of materials, and having suitably mounted therein, as can be seen in FIG. 4, an electric motor 12, belt transmission 13, a cylindrical planing means 14, all suitably journalled with bearings 15. As can be further seen from FIG. 4, for instance, the housing 11 comprises two complementary parts 11A and 11B which are suitably secured as by an illustrative screw 16 as noted.

The planer 10 also possesses a suitably positioned handle 17 having mounted therein a conventional electric trigger switch 18 which is interposed between an electric conduit 19 and the electric motor in a manner well known. The forward part of the handle has a chip expelling means 20. The most forward part of the planer 10 has a clamping screw knob 21 that permits the forward shoe 22 at the forward underside of the planer to be selectively raised or lowered in relatively small increments whereby the size of the cut produced by the rotating cylindrical planing means is controlled.

The side of the housing 11 shown in FIG. 1 is supplied with hollow cover 23 which is secured to the housing as by suitably placed screws 24. The hollow cover 23 provides access to the brushes 25 (as seen in FIG. 4) of the electric motor 12 and, importantly, carries the essential component parts of the combination guard and depth gauge 30 of the present invention.

The said combination guard and depth gauge is constructed of relatively few parts. With regard thereto attention is directed to such figures as FIGS. 1, 3, 4, 5, and 6, with special emphasis to FIG. 6.

The cover 23 has a rectangularly shaped top opening 31. Externally of the side of the cover 23 is a knob 32 having centrally a female thread 33 which can be readily seen from FIGS. 4 and 6. The knob 32 is screwed onto bolt 34 which extends outwardly from the cover 23 through elongated slot 35 of a vertically positioned U-shaped member 36, then through aperture 37 in the cover 23, through washer 38. The U-shaped member 36 is adjustably slidably mounted between rails 39 extending inwardly from cover 23 and are suitably aligned with the top opening whereby the U-shaped member 36 is permitted to project therethrough. It will be appreciated the assembly just described permits clamping of the U-shaped member into a desired secured position achieved by tightening the knob 32. A new position may be selected by loosening the knob 32 thereby permitting the relocation of the U-shaped member 36.

Behind the U-shaped member 36 and having portions complementary therewith is an L-shaped plate 40. The said plate 40 terminates in shoe 41 which is the bottom leg of the said plate 40. The bottom facing portion of the shoe is adapted to be in slidable engagement with the surface of a work piece to be rabbeted. The plate has a relatively large opening 42 extending from the said shoe 41 in an upward manner. A first pair of perpendicular projections 43 extend from the sides of the opening 42 which are adapted and constructed to ride internally and against the legs 28 of the U-shaped member 36 as can best be seen from FIG. 6. Vertically displaced therefrom and below the first pair of projections is a second pair of curved projections 44 also designed to ride internally with respect to said U-shaped member 36.

Figure 5:
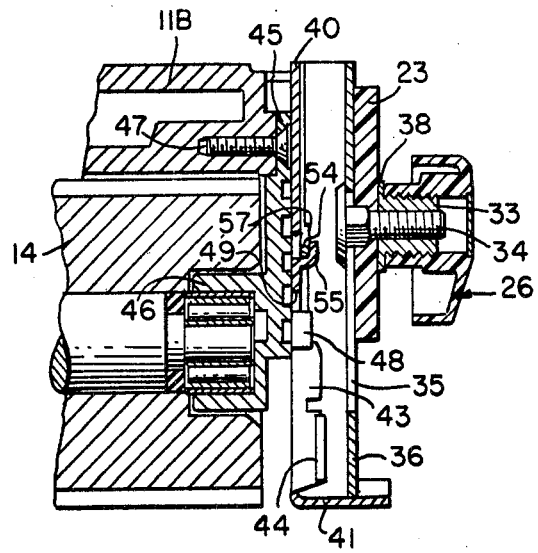
FIG. 5 is a partial vertical cross-sectional view taken along line 5—5 of FIG. 3 showing a portion of the combination guard and depth gauge and associate structure.
Figure 6:
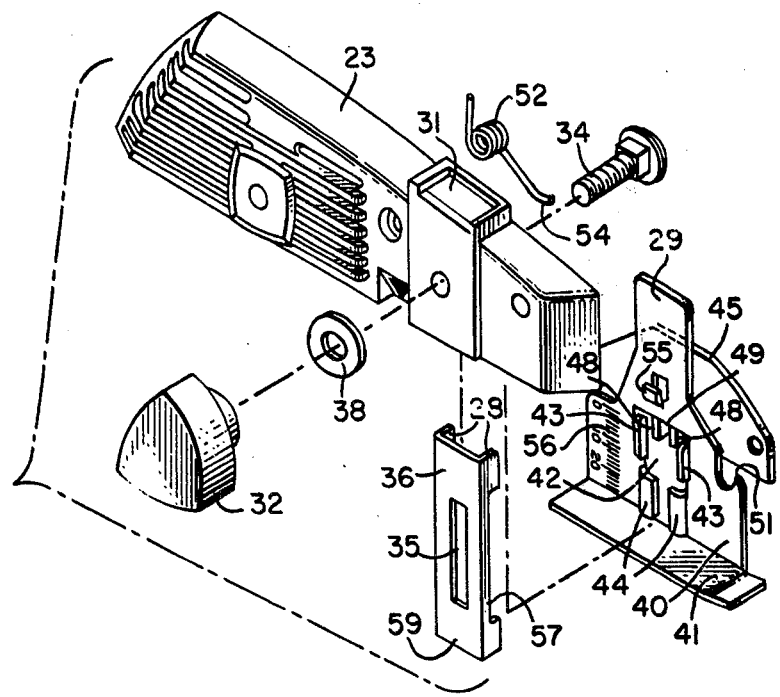
FIG. 6 is an exploded view of the combination of the guard and depth gauge portion.

The arrangement herein just discussed is in operative association with a bearing plate 45 shown in FIGS. 5 and 6. On one surface of the bearing plate is a journalling means 46 for one bearing of the planing means 14. The bearing plate 45 is secured to the housing at the ends thereof as by machine screws 47. The other side of the bearing plate 45 has abutment means in the form of two perpendicular projections 48 adapted and constructed to project into opening 42 which operates as a slot means. The extent of the downward movement of the L-shaped plate 40 is controlled by the said projections 48 which abut against edge 49 of the opening 42 when the L-shaped plate 40 is at full descent.

From FIGS. 1 and 6 it will be seen that an upwardly facing notch 51 is positioned whereby the L-shaped plate 40 is not impeded in its upward movement by one of the screws 24 designed to afix the cover 23 in place.

In order to drive the L-shaped plate 42 downwardly to the maximum position defined by the edge 49 of the opening 42 and the projections 48 of the bearing plate 45, a short helical spring 52 is mounted on an inwardly extending projection 53 of the cover 23. The projection 53 accommodates a cover screw 24 contained in a bore thereof. The active end 54 of the spring rides against hook 55, stamped out of L-shaped plate 40, downwardly perpendicularly with respect to the bottom of the planer surface. The active end 54 of the spring is positioned in the recess 57 shown on each leg 28 of the U-shaped member 36. As a result, portion 29 of the L-shaped plate 40 is permitted to easily ride against the leading edges of the legs 28.

It should be noted that from FIGS. 1 and 6, the upstanding portion of L-shaped plate 40 is supplied with graduations 56 designed to provide suitable indicia on the depth of rabbeting that may be achieved. For instance, while holding the planer vertically, knob 32 is loosened whereby U-shaped member 36 drops downwardly to the top of the shoe 41. Then, the shoe 41 is pushed upwardly into cover 23 and in doing so U-shaped member 36 is also tandemly pushed into the cover 23. The cover 23 is supplied with a position discerning edge 58 against which the disappearing graduations are noted. The more the shoe 41 is moved upwardly and concomitantly the U-shaped member 36, the higher will be the stop afforded by the bottom edge 59 of the U-shaped member 36 when the knob 32 is retightened thereby clamping the U-shaped member 36 into place. Of course a release of the shoe 41 will again permit the L-shaped plate 40 to project to its furthermost position defined by the edge 49 of the opening 42 and the projections 48 of the bearing plate 45.

Figure 2:
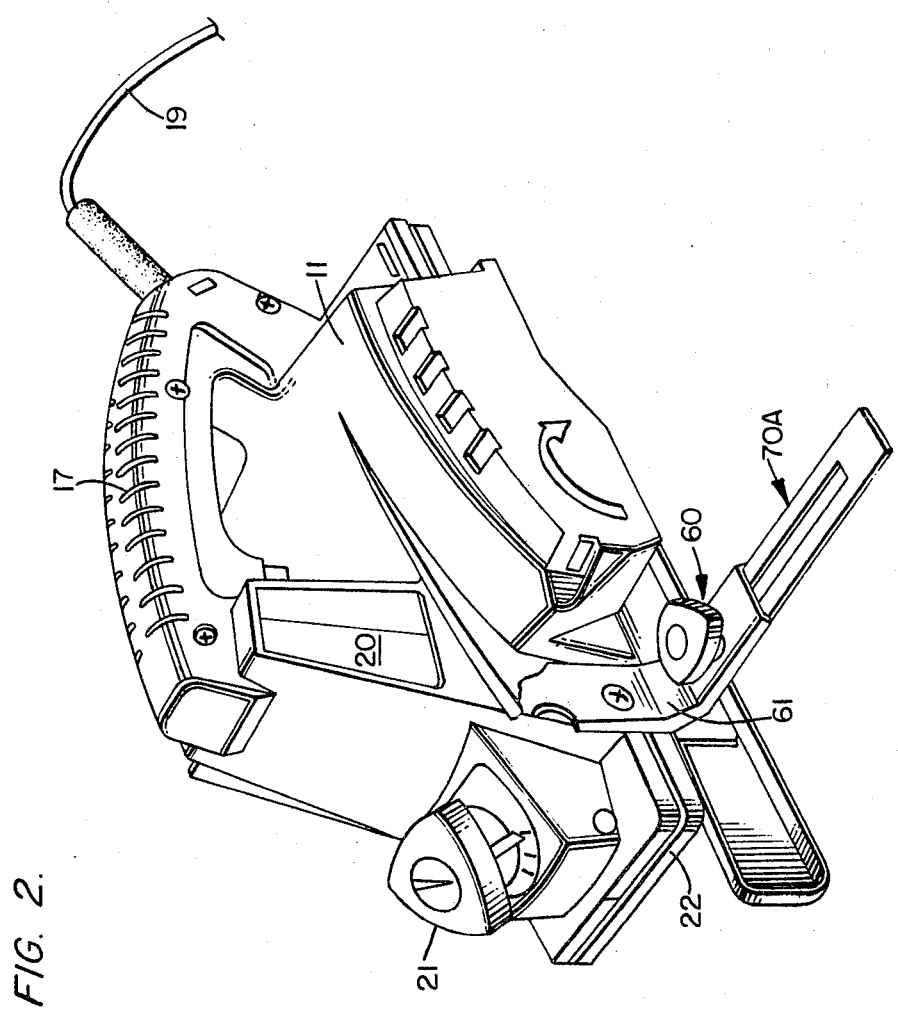
FIG. 2 is a perspective view of the planer showing the other side to which is attached a fence assembly.
Figure 3:
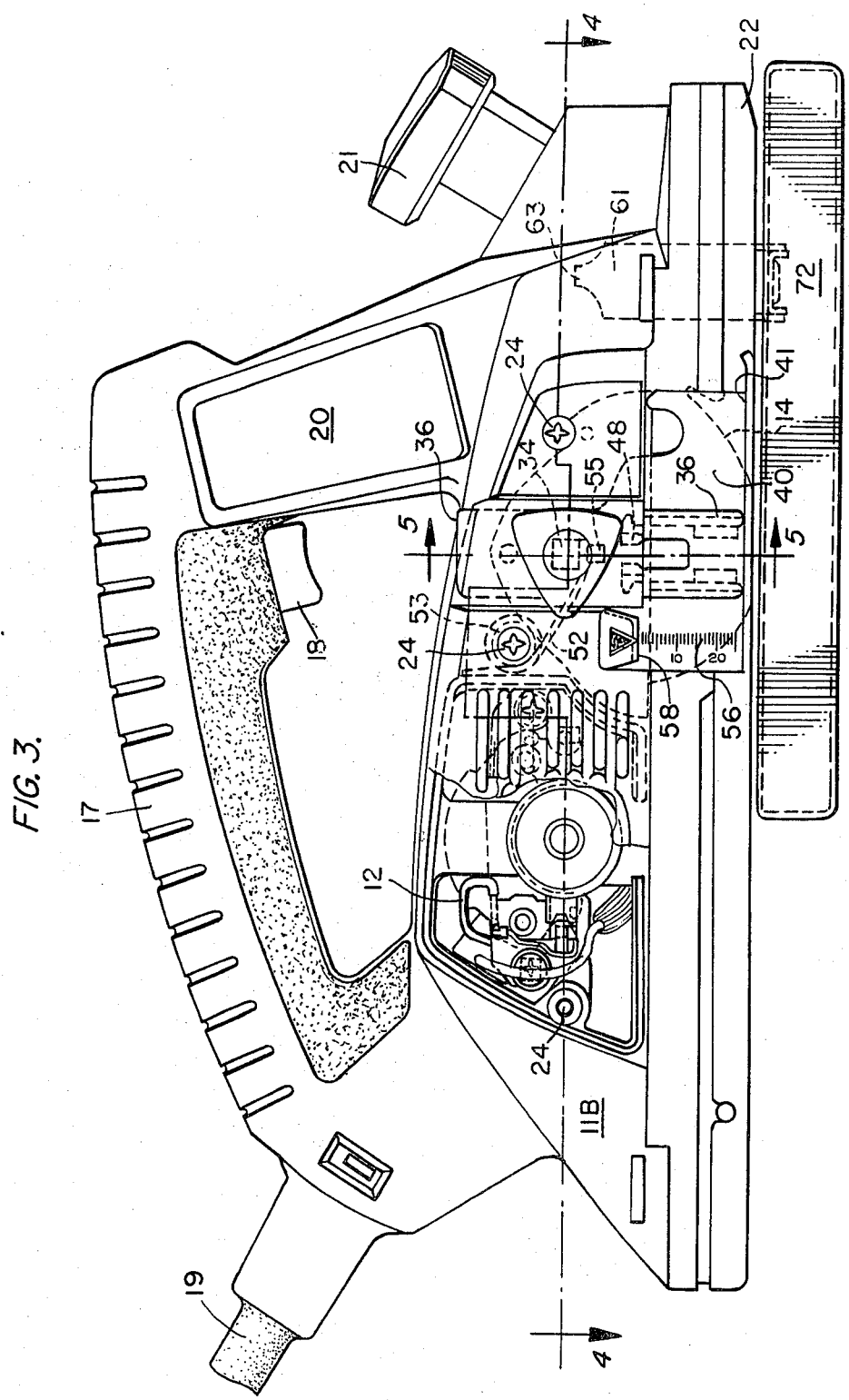
FIG. 3 is a side elevation having a portion of a side cover broken away and showing more details of the combination guard and depth gauge.
Figure 7:
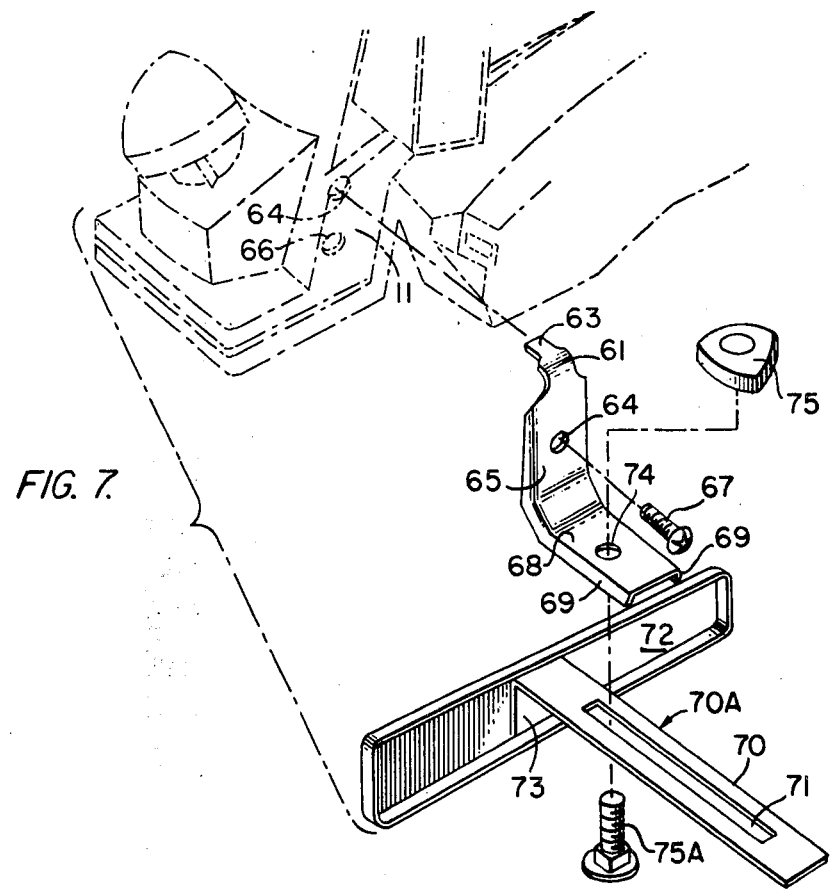
FIG. 7 is an exploded view of the fence assembly.

Attention is now directed to FIGS. 2, 3 and 7 for a review of the fence assembly 60 designed to control the width of the rabbeting capable of being produced. The fence assembly 60 includes an L-shaped bracket 61 terminating in a horizontal tongue 63 adapted and constructed to fit into a small well 64 located at the side of the housing 11A. The upstanding portion 65 of the L-shaped bracket 61 has an aperture 64 which is in alignment with a female threaded means 66 designed to accept the machine screw 67 whereby the L-shaped bracket is securely affixed to the planer. The lower leg 68 of the L-shaped bracket has short depending skirts 69 dimensioned to embrace the fence 70A including an elongated member 70 having an elongated slot 71 therein. The fence 70A is completed by the presence of a plate 72 centrally affixed to the elongated member 70 at one end thereof as by welding or the like at appendage 73 of the elongated member 70. The elongated member 70 will be seen to carry the plate 72 the far side of which provides an abutting surface against which a work piece may be positioned.

The elongated member 70 is secured to the lower leg 68 of the L-shaped bracket by means of bolt 75A which is located in the slot 71 and through aperture 74 in the lower leg 68. A knob 75 having a female threaded portion is designed to be selectively loosened and tightened to permit the plate 72 to move from one furthermost position shown in FIG. 2 to the other furthermost position as afforded by the extent of the slot. In diminishing the width of the rabbeting, the plate 72 moves underneath the planer in the direction of the combination depth gauge and guard aforementioned in detail.

Having carefully discussed with sufficient particularity the component which is the combination of the guard and depth gauge and the component which is the fence assembly, it is now incumbent to discuss how these two components are useful in achieving rabbeting operation. Attention is therefore directed to FIGS. 8A, 8B, and 8C.

Figure 8A:
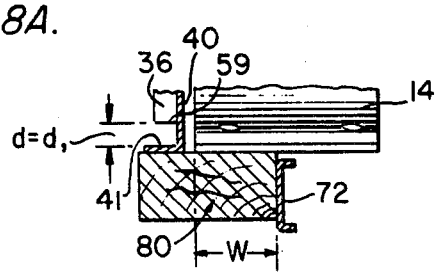
FIG. 8A is a fragmented view showing the use of the planer prior to rabbeting.
Figure 8B:
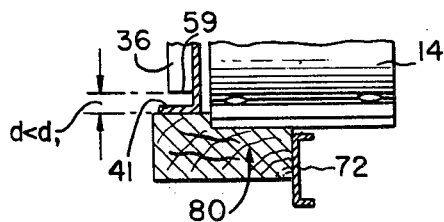
FIG. 8B is a similar view during the course of rabbeting.
Figure 8C:
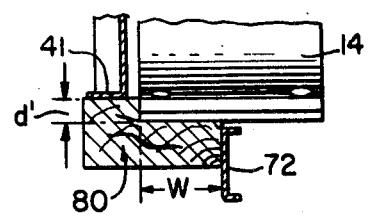
FIG. 8C is a similar view at the conclusion of the rabbeting procedure.

The planer may first be adjusted for a depth d=d, of the rabbet to be made by carrying out the steps hereinbefore discussed so that U-shaped member 36 is secured whereby the shoe 41 is spaced from the bottom of the U-shaped member by the amount "d,". The L-shaped plate 40 also acts as a guard and prevents access to the planing means 14 from the left side of the Figures as shown or from the right side as the planer is held. The fence assembly 60 is moved under the planer to fix the desired width "W" of the rabbet cut by moving the outwardly facing surface of plate 72 in abutment with the side of work piece 80. FIG. 8A illustrates the beginning of the operation. FIG. 8B shows a part of the rabbet that has been cut. Note that the quantity "d" is smaller as the planer descends and as shoe 41 ascends. Finally, FIG. 8C shows shoe 41 stopped at the bottom of U-shaped member 36 at its lowermost edge 59. The rabbet cut has been completed and the depth of the cut equals "d," of FIG. 8A. The width of the cut W is set by adjusting the fence assembly 60.

It will be noted that throughout the rabbeting operation there is no possibility for access by the operator to the planing means 14 from the side having the combination guard and depth gauge.

To further increase the understanding of the function of the depth gauge and guard combination, attention is again directed to FIG. 3. It will be noted therefrom that the depth gauge is set for zero depth as evidenced by the position of the U-shaped member 36 with its edge 59 lying in directed abutment on the top surface of the shoe 41. In FIG. 8A, for instance, the U-shaped member 36, shown as a fragment has been previously locked into position in spaced relationship to the top of shoe 41 thereby setting the desired depth "d," for the rabbet cut to be made.

What is claimed is:

1. A portable handheld planer for planing a workpiece, comprising:

a housing containing a substantially cylindrical planing tool rotatably mounted for rotation about a horizontal axis;

a motor supported by said housing for driving the planing tool;

shoe means, connected to said housing, for supporting the planer on the workpiece, and in conjunction with said planing tool determining the size of the cut produced by each pass during the planing operation;

guard means, disposed adjacent the planing tool, for blocking access to one end thereof during the planing operation, said guard means being connected to the housing for movement relative to said shoe means in a direction transverse to said horizontal axis;

resilient means for resiliently urging said guard means downwardly for engagement with an unplaned portion of the workpiece and yieldably allowing upward movement of said guard means relative to said shoe means while a rabbet is being cut;

stop means for controlling the extent to which the guard means can be moved upwardly to set the depth to which the completed rabbet will be cut; and adjustment means for adjusting the position of said stop means whereby said depth of the rabbet can be adjusted to any value within a predetermined range of values.

2. The portable handheld planer of claim 1, further comprising abutment means for limiting the downward movement of said guard means.

3. The portable handheld planer of claim 1, further comprising fence means for controlling the width of the rabbet.

4. The portable handheld planer of claim 1, wherein said guard means is mounted alongside an end of the planing tool at one side of the housing, the guard means being limited in its downward movement by a fixed abutment mounted in the planer.

5. The portable handheld planer of claim 4, wherein the stop means includes an elongated member that depends to a predetermined extent from the housing and has an end that abuts against a projection on the guard means.

6. The portable handheld planer of claim 5 wherein the projection on the guard means is a horizontal plate means adapted and constructed to be in sliding contact with a workpiece when said planer is operated.

7. The portable handheld planer of claim 6, wherein said one side of the housing is provided with a channel in which said elongated member and an upstanding elongated portion of the guard means are positioned.

8. The portable handheld planer of claim 4, further comprising fence means, at the opposite side of the housing, including a bracket having an essentially upstanding portion and an essentially horizontal portion, the horizontal portion extending outwardly from the side of the housing, an elongated member below said horizontal portion adapted and constructed to be clamped together at a predetermined position, the end of the elongated member proximate the housing having a wall normal to the elongated member and disposed to be movable under the planing tool and housing to achieve a desirable fixed position.

9. A portable handheld planer for planing a workpiece, comprising:
 a housing containing a substantially cylindrical planing tool rotatably mounted for rotation about a horizontal axis;
 a motor for driving the planing tool;
 a combination guard and adjustable rabbeting depth gauge mounted on one side of said housing, and comprising guard means, resilient means, abutment means, and stop means;
 said guard means being mounted adjacent one end of the planing tool for blocking access to said end during the planing operation, and being slideably mounted in the housing for movement in a direction transverse to said horizontal axis;
 said resilient means resiliently urging said guard means downwardly for engagement with the workpiece into which a rabbet cut is to be made;
 said abutment means limiting downward movement of said guard means;
 said stop means being adjustable in elevation for controlling the extent to which the guard means may be moved upwardly during the planning operation thereby adjustably setting the depth to which the rabbet cut is to be made; and
 fence means, mounted on the other side of said housing, for controlling the width of the rabbet cut.

10. The portable handheld planer of claim 9, further comprising:
 shoe means, connected to said housing, for supporting the planer on the workpiece, and in conjunction with said planing tool determining the size of the cut produced by each pass during the planing operation; and
 wherein said guard means is movable relative to said shoe means and said resilient means yieldably allows upward movement of said guard means relative to said shoe means while a rabbet is being cut.

11. The portable handheld planer of claim 1 or 10, wherein said shoe means has a rear shoe extending rearwardly of said planing tool, and a forward shoe extending forwardly of said planing tool, said forward shoe being adjustable vertically with respect to said rear shoe for adjusting the size of cut produced during each said pass.

12. A portable handheld planer for planing a workpiece, comprising:
 a housing having a vertically disposed channel therein;
 a planing tool rotatably mounted in said housing;
 a motor mounted in said housing for driving said planing tool;
 forward and rear shoes forming the bottom of said housing and adapted to support the planer on the workpiece, there being an opening between said shoes through which said planing tool extends to a small extent;
 a guard plate disposed vertically and to one side of said shoes adjacent to one end of said planing tool for blocking access thereto, and having an upward extension slideably mounted in said channel to permit vertical movement of said guard plate relative to said shoes, said guard plate having a horizontally disposed shoe at the bottom thereof, said guard plate shoe being disposed adjacent and outwardly of said one end of said planing tool and adapted to slideably engage an unplaned portion of the workpiece;
 abutment means, associated with said channel, for limiting the downward movement of said guard plate thereby determining the lowest position thereof;
 a stop member mounted in said channel and adjustable vertically therein for controlling the extent to which said guard plate shoe can be moved upwardly relative to said housing bottom, whereby the depth is set to which the completed rabbet will be made;
 resilient means for urging said guard plate downwardly against the unplaned portion of the workpiece, whereby whenever the planer is raised from the work piece said guard plate is urged downwardly to said lowest position; and
 a fence assembly adjustably mounted on the other side of said housing, and having a fence parallel to said guard plate and adjustable theretowards and away therefrom to determine the width of the rabbet.

* * * * *